United States Patent [19]

McCoy

[11] 4,024,057

[45] May 17, 1977

[54] PORTABLE, COLD GREASE REMOVER

[76] Inventor: Dorothy Joan McCoy, 3101 Breneman, Boise, Idaho 83702

[22] Filed: June 4, 1976

[21] Appl. No.: 693,056

[52] U.S. Cl. .................................. 210/71; 62/123; 62/532; 208/37; 210/175
[51] Int. Cl.² ..................... B01D 35/18; C02B 1/02
[58] Field of Search ............ 210/470, 471, 71, 175; 62/58, 123, 532; 208/35, 37, 38

[56] References Cited

UNITED STATES PATENTS

| | | | |
|---|---|---|---|
| 872,257 | 11/1907 | Schicht | 62/123 |
| 914,183 | 3/1909 | Porges et al. | 62/123 |
| 2,031,107 | 2/1936 | Hopper | 210/71 |
| 2,057,883 | 10/1936 | Dehn | 210/470 |
| 2,572,524 | 10/1951 | Schmeiler | 210/470 |
| 3,400,548 | 9/1968 | Drayer | 62/123 |
| 3,484,946 | 12/1969 | Saver | 62/123 |
| 3,597,164 | 8/1971 | Ab-Der-Halden | 62/123 |

*Primary Examiner*—Frank W. Lutter
*Assistant Examiner*—Frank Sever

[57] ABSTRACT

A grease removing device for removing liquid grease from solutions such as soups and broths and a method for using the device are disclosed. The grease removing device includes a flat plate having a multiplicity of projections on its undersurface. A container for holding coolant and a handle are also provided. In operation, the plate is cooled to a temperature lower than the freezing point of the grease; the undersurface of the plate is then brought into contact with the floating grease; and the plate with the attached solidified grease is then removed from the solution.

3 Claims, 5 Drawing Figures

PORTABLE, COLD GREASE REMOVER

BACKGROUND OF THE INVENTION

1. Field of the Invention

This invention relates, in general, to grease removing devices and processes, and in particular, to removing devices and processes, and in particular, to grease removal devices which cool and solidify the grease.

2. Description of the Prior Art

It is often desirable to remove grease from other liquids. This is particularly true in the case of soups and broths, where grease removal may be required or desired because of diet considerations and for purely esthetic reasons. In the past, the offending grease has been removed by cooling, removing the grease, and reheating. This process involves considerable time and may result in undesired softening of other elements of the broth. Grease has also been removed by spooning and skimming as disclosed in the patents to Marcus, U.S. Pat. No. 3,200,954 and Schmeiler, U.S. Pat. No. 2,572,524. A U.S. patent to Wessels, U.S. Pat. No. 3,326,384 discloses a skimmer utilizing converging planes to reduce surface area. These devices are also time-consuming and it is extremely difficult to remove all of the floating grease by these methods.

SUMMARY OF THE INVENTION

The present invention comprises a grease remover having a substantially flat plate having a multiplicity of projections from its undersurface to increase surface area. A container for holding a coolant and a handle are also provided. Also provided is a second container sealing a freezable liquid within, which may be disposed in the first container. The plate is cooled and brought into contact with grease floating on another solution. The grease solidifies in contact with the plate and the plate is then removed from the solution.

It is therefore an object of the present invention to provide a grease removing device which removes grease by adhesion and solidification.

It is a further object of the present invention to provide a grease remover having a handle detachable from the plate contacting and cooling the grease.

Another object of the present invention is to provide a grease remover containing a coolant.

A still further object of the present invention is to provide a grease remover having a collapsible coolant container.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
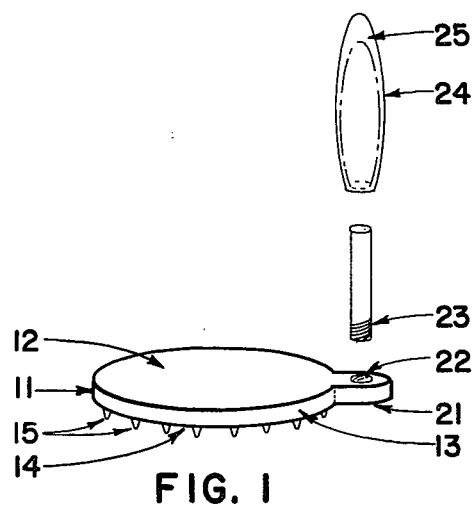
FIG. 1 is an elevated perspective view of one embodiment of the present invention.

Referring now the the drawings, and in particular to FIG. 1, one embodiment of the grease remover of the present invention is shown. This embodiment includes a disc-shaped plate 11 having a substantially planar top surface 12, side walls 13, and an undersurface 14, best seen in FIG. 2, containing a multiplicity of projections 15. Also included in this embodiment is a handle attachment flange 21 which is fastened to and extends outwardly transverse to side wall 13. Flange 21 contains a threaded hole 22 for receiving a threaded machine screw 23 extending downwardly from handle 24. Handle 24 has an insulative covering 25 for protecting the hand from the cold temperature of the plate as will hereinafter be more fully explained.

Figure 3:
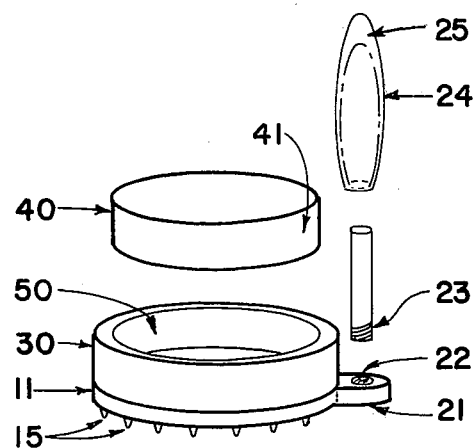
FIG. 3 is an elevated perspective view of the present invention showing upstanding side walls and a sealed container locatable within the side walls.

Referring now to FIG. 3, a second alternative embodiment of the present invention is illustrated. FIG. 3 shows the embodiment as described above, but includes cylindrical side walls 30 securedly mounted flush with the outer walls of plate 11. It is contemplated that side walls 30 will be molded of the same material and be continuous with plate 11. Side walls 30 extend upwardly transverse from the top surface 12 of plate 11 for a distance of approximately ½ inch. It will be seen that side walls 30 together with top surface 12 of plate 11 form a watertight container 50. Container 50 may conveniently hold ice cubes or other low-temperature materials for contact with and cooling of plate 11. Also shown in FIG. 3 is sealed container 40 containing a liquid 41 such as water.

Figure 4:
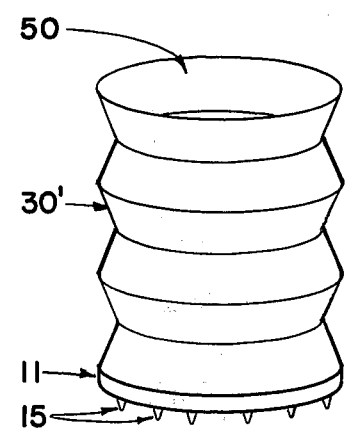
FIG. 4 is an elevated perspective view of the present invention showing extendable side walls.
Figure 5:
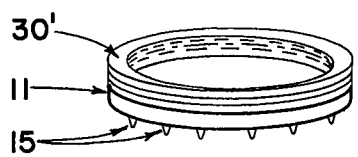
FIG. 5 shows the embodiment of the invention shown in FIG. 4 with collapsed side walls.

Another embodiment of the present invention is shown in FIG. 4. In this embodiment expansible side walls 30' are substituted for the rigid side walls of the embodiment shown in FIG. 3. Side walls 30' extend upwardly transverse to plate 11 as in the embodiment of FIG. 3, described above. It is contemplated that the side walls 30' will be of the same material and continuous with plate 11. Side walls 30' are comprised of aluminum foil which has been compressed in accordion manner. In the compressed state, as shown in FIG. 5, the walls 30' are pressed tight against the top surface 12 of plate 11. In this manner, the device takes little room and can be conveniently stored or packaged. Side walls 30' may by be expanded to the position shown in FIG. 4 my simply pulling the walls upward from the plate 11 with the fingers. Once expanded, the walls 30' together with plate 11 form a water tight container 50. Ice cubes or other coolants may then be placed in container 50 for cooling plate 11.

To remove grease from a solution, for example soup or broth, plate 11 is cooled to a temperature below the freezing point of the grease to be removed. The word "freezing" as used in this specification and the claims appended hereto refers to the solidification of the grease. The word "grease" refers not only to animal fats, but vegetable and petroleum oils as well. For animal fat, the temperature of the plate is lowered to 32° F or lower. This may be accomplished by placing the plate in the freezing compartment of conventional home refrigerators or freezers. Another means of cooling plate 11 is to place a coolant such as ice cubes or ice water in container 50 formed by plate 11 in conjunction with side walls 30 or 30'. Similarly, water may be placed in container 50 and frozen. Another alternative is to cool or freeze liquid 41, sealed within container 40 and place into container 50. It is important when using container 40 that it be placed in as close of contact as possible with plate 11 so that maximum conduction of heat may take place.

Figure 2:
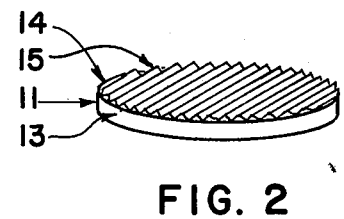
FIG. 2 is an elevated perspective view of the undersurface of the plate portion of the present invention showing projections.

Once plate 11 has been sufficiently cooled, the undersurface 14 and its projections 15, as seen in FIGS. 1 and 2, are brought into contact with the surface of the grease floating on the surface of the broth or soup. The heat of the grease is then conducted into plate 11, causing the grease to solidify and adhere to the undersurface of the plate. The plate is moved back and forth over the surface of the grease until a desired amount of grease adheres against the projections of the plate. The plate containing the grease is then remove from the solution. Solidified grease may be removed from the plate by scraping or heating. The process is repeatable a desired number of times.

It is essential that plate 11, including projections 15, be manufactured from a good heat conductor such as aluminum. It is also contemplated that side walls 30 and 30' will also be made of the same material. Projections 15 may be in the form of serrations, knobs, or otherwise, the purpose being to increase the surface area on the underside of plate 11 for maximum heat conduction. Handle 24 may be made from any suitable material. It is preferred that the handle be made from or covered with an insulative material such as plastic or wood. Container 40 may be made of any material which is sufficiently elastic to accomodate freezing and thawing of liquid 41. A thin metal such as aluminum in preferred because of conductivity. Thin-walled plastic is also contemplated. Liquid 41 may be ordinary tap water or other conventional coolant liquids may be used. The advantage of using container 40 with the sealed-in liquid 41 is to prevent accidental spills of a coolant into the soup or broth.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A portable grease removing device for removing grease from the surface of a liquid body, comprising:

A container for containing a coolant, said container having a base in the form of a disc-shaped plate having a planar undersurface with a multiplicity of grease contacting projections protruding therefrom, and a generally cylindrical side wall fixed to said base; said side wall being axially extendable and contractable in an accordian manner.

2. The device of claim 1, further comprising a detachable handle.

3. A process for removing grease from the surface of a liquid body comprising:

a. Cooling a disc-shaped grease containing surface which comprises a multiplicity of grease contacting projections protruding therefrom, with a coolant contained within a container formed by said contacting surface and a generally cylindrical side wall to said contacting surface; said side wall being axially expandable and contractable in an accordian manner, b. Contacting said contacting surface with the surface of said liquid body for a time sufficient to freeze grease thereon, c. Removing said contacting surface from contact with said surface of said liquid body.

* * * * *